(12) United States Patent
Yang et al.

(10) Patent No.: US 11,597,351 B2
(45) Date of Patent: Mar. 7, 2023

(54) ELECTRONIC DEVICE FOR MANAGING APPLICATION RELATING TO KEY OF EXTERNAL ELECTRONIC DEVICE, AND OPERATING METHOD OF ELECTRONIC DEVICE

(71) Applicant: Samsung Electronics Co., Ltd., Gyeonggi-do (KR)

(72) Inventors: Yi Yang, Gyeonggi-do (KR); Jonghwan Kim, Gyeonggi-do (KR); Byounghak Jin, Gyeonggi-do (KR); Bokun Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/977,731

(22) PCT Filed: Mar. 14, 2019

(86) PCT No.: PCT/EP2019/051663
§ 371 (c)(1),
(2) Date: Sep. 2, 2020

(87) PCT Pub. No.: WO2019/194427
PCT Pub. Date: Oct. 10, 2019

(65) Prior Publication Data
US 2020/0391695 A1 Dec. 17, 2020

(30) Foreign Application Priority Data
Apr. 2, 2018 (KR) .................... 10-2018-0038324

(51) Int. Cl.
*B60R 25/24* (2013.01)
*G06F 21/35* (2013.01)

(52) U.S. Cl.
CPC ............ *B60R 25/241* (2013.01); *G06F 21/35* (2013.01)

(58) Field of Classification Search
CPC combination set(s) only.
See application file for complete search history.

(56) References Cited

U.S. PATENT DOCUMENTS 9,386,403 B2 7/2016 Ledru
11,258,875 B2 * 2/2022 Kouru .................... H04L 67/06
(Continued)

FOREIGN PATENT DOCUMENTS

JP          2009030312        2/2009
JP          2010-028485       2/2010
(Continued)

OTHER PUBLICATIONS

PCT/ISA/210 Search Report issued on PCT/KR2019/002945, dated Jun. 24, 2019, pp. 5.
(Continued)

*Primary Examiner* — Nabil H Syed
*Assistant Examiner* — Cal J Eustaquio
(74) *Attorney, Agent, or Firm* — The Farrell Law Firm, P.C.

(57) ABSTRACT

In an electronic device and an operating method of an electronic device, according to various embodiments, the electronic device comprises: a communication module frequency performing communication with an external electronic device; and a security module which monitors a change in data relating to an applet for managing a key used for the authentication of the external electronic device, which manages information relating to the applet, and which stores the applet and an applet identification (AID) list including at least one AID, wherein the security module can be configured to receive, from the external electronic device, a signal for requesting the application identifier (AID) list to be transmitted, transmit the AID list to the external electronic device through the communication module in (Continued)

response to the reception of the requesting signal, receive, from the external electronic device, a signal for requesting information relating to an applet associated with at least one AID selected, from among AIDs included in the AID list, by the external electronic device, and transmit, to the external electronic device, information relating to an applet corresponding to the selected AID. Additional various embodiments are possible.

14 Claims, 11 Drawing Sheets

(56) References Cited

U.S. PATENT DOCUMENTS

| | | | | |
|---|---|---|---|---|
| 2008/0160983 | A1* | 7/2008 | Poplett | H04L 67/04 455/419 |
| 2010/0017626 | A1* | 1/2010 | Sato | G06F 21/10 713/193 |
| 2013/0160141 | A1* | 6/2013 | Tseng | G06F 21/31 726/28 |
| 2015/0149042 | A1* | 5/2015 | Cooper | B60R 25/245 701/48 |
| 2016/0127351 | A1* | 5/2016 | Smith | H04L 63/12 726/10 |
| 2019/0066409 | A1* | 2/2019 | Moreira da Mota | G07C 5/0808 |

FOREIGN PATENT DOCUMENTS

| | | |
|---|---|---|
| KR | 1020140013639 | 2/2014 |
| KR | 1020140048554 | 4/2014 |
| KR | 10-1612828 | 4/2016 |
| KR | 101612828 | 4/2016 |
| KR | 1020160056987 | 5/2016 |

OTHER PUBLICATIONS

PCT/ISA/237 Written Opinion issued on PCT/KR2019/002945, dated Jun. 24, 2019, pp. 6.

Korea Office Action dated Oct. 11, 2022 issued in counterpart application No. 10-2018-0038324, 17 pages.

* cited by examiner

FIG. 10

```
6F File Control Information (FCI) Template
   84 Dedicated File (DF) Name
      325642E5359532E4444463031 // '2VK.SYS.DDF01'
   A5 File Control Information (FCI) Proprietary Template
      BF0C File Control Information (FCI) Issuer Discretionary Data
         61 Application Template
            4F Application Indentifier (AID)
               02860001590114D001
            50 Application Label
               424D57205835 // 'BMW X5'
            87 Application Priority Indicator
               01
```

ELECTRONIC DEVICE FOR MANAGING APPLICATION RELATING TO KEY OF EXTERNAL ELECTRONIC DEVICE, AND OPERATING METHOD OF ELECTRONIC DEVICE

PRIORITY

This application is a National Phase Entry of PCT International Application No. PCT/KR2019/002945 which was filed on Mar. 14, 2019, and claims priority to Korean Patent Application No. 10-2018-0038324, which was filed on Apr. 2, 2018, the content of each of which is incorporated herein by reference.

TECHNICAL FIELD

Various embodiments of the disclosure relate to an electronic device for managing an application related to a key of an external electronic device and an operating method of an electronic device.

BACKGROUND ART

Technology capable of performing authentication with an external electronic device through a smart key supporting wireless communication is being developed. For example, in the case where an external electronic device is a vehicle, development of technology related to a smart key capable of performing functions provided by a vehicle, such as unlocking a vehicle door, starting an engine of a vehicle, and the like is under way. The smart key is capable of performing an authentication procedure with a vehicle using short-range communication and activating functions of the vehicle, such as unlocking or starting thereof, after the authentication is completed.

Recently, technology has been introduced in order to perform functions provided by a vehicle using a portable terminal such as a smartphone, a wearable device, or the like, which can be held by a user, instead of using a separate smart key for activating the functions of the vehicle.

Recently, vehicle manufacturers have provided a vehicle key to a portable terminal so that the owner or sharers of a vehicle can perform various types of functions such as opening the vehicle door, igniting an engine of the vehicle, and the like using the portable terminal in the same manner as a normal smart key.

DISCLOSURE OF INVENTION

Technical Problem

A vehicle key or an application for managing the vehicle key may use a vehicle key solution based on a security module separately provided in a portable terminal in order to provide security.

There may be a situation in which a single user uses a plurality of vehicles or in which a plurality of users shares a vehicle. In this situation, it may not be easy for a user to use a single portable terminal as a key for each of a plurality of vehicles with security and convenience.

In particular, the vehicle has no information on the number of applications used in authentication for vehicles, which are provided in a portable terminal that establishes a communication connection with the vehicle. If all of a plurality of applications used for authentication of the vehicles attempt authentication, the time required for authentication may increase.

Solution to Problem

An electronic device according to various embodiments of the disclosure may include: a communication module configured to communicate with an external electronic device; and a security module configured to monitor a change in data related to applets for managing keys used for authentication of the external electronic device, manage information related to the applet, and store an applet identification (AID) list including one or more AIDs and the applets, wherein the security module may be configured to: receive, from the external electronic device, a signal making a request for transmitting the AID (application identifier) list; in response to reception of the request signal, transmit the AID list to the external electronic device through the communication module; receive, from the external electronic device, a signal requesting information related to an applet associated with at least one AID selected from among the AIDs included in the AID list by the external electronic device; and transmit the information related to the applet corresponding to the selected AID to the external electronic device.

An electronic device according to various embodiments of the disclosure may include: a memory; a security module configured to store data fused for authentication with an external electronic device; a communication module; and a processor, wherein the security module may be configured to broadcast a connection request signal or a connection with the external electronic device, establish a communication channel with the external electronic device that responds to the broadcast signal, transmit a signal making a request for transmitting an application identifier (AID) list including one or more AIDs stored in the external electronic device, select at least one AID from among the AIDs included in the AID list transmitted by the external electronic device, request information indicating an applet corresponding to the selected AID and information related to the applet corresponding to the selected AID, and perform authentication with the external electronic device using the information related to the applet received from the external electronic device.

An operating method of an electronic device according to various embodiments of the distribution may include; broadcasting a connection request signal for a connection with an external electronic device and establishing a communication channel with the external electronic device hint responds to the broadcast signal; transmitting a signal making a request for transmitting an application identifier (AID) list including one or more AIDs stored in the external electronic device; selecting at least one AID from among the AIDs included in the AID list transmitted by the external electronic device; requesting information indicating an applet corresponding to the selected AID and information related to the applet corresponding to the selected AID; and performing authentication with the external electronic device using the information related to the applet received from the external electronic device.

Advantageous Effects of Invention

In the electronic device and the operating method of the electronic device according to various embodiments of the disclosure, an external electronic device performs authentication for a selected applet identification, instead of performing authentication for all of the applets stored in the electronic device, thereby reducing the time required for authentication.

BRIEF DESCRIPTION OF DRAWINGS

FIG. 10 is a diagram illustrating a specific example of data related to an applet transmitted by an electronic device according to various embodiments of the disclosure.

MODE FOR THE INVENTION

Figure 1:
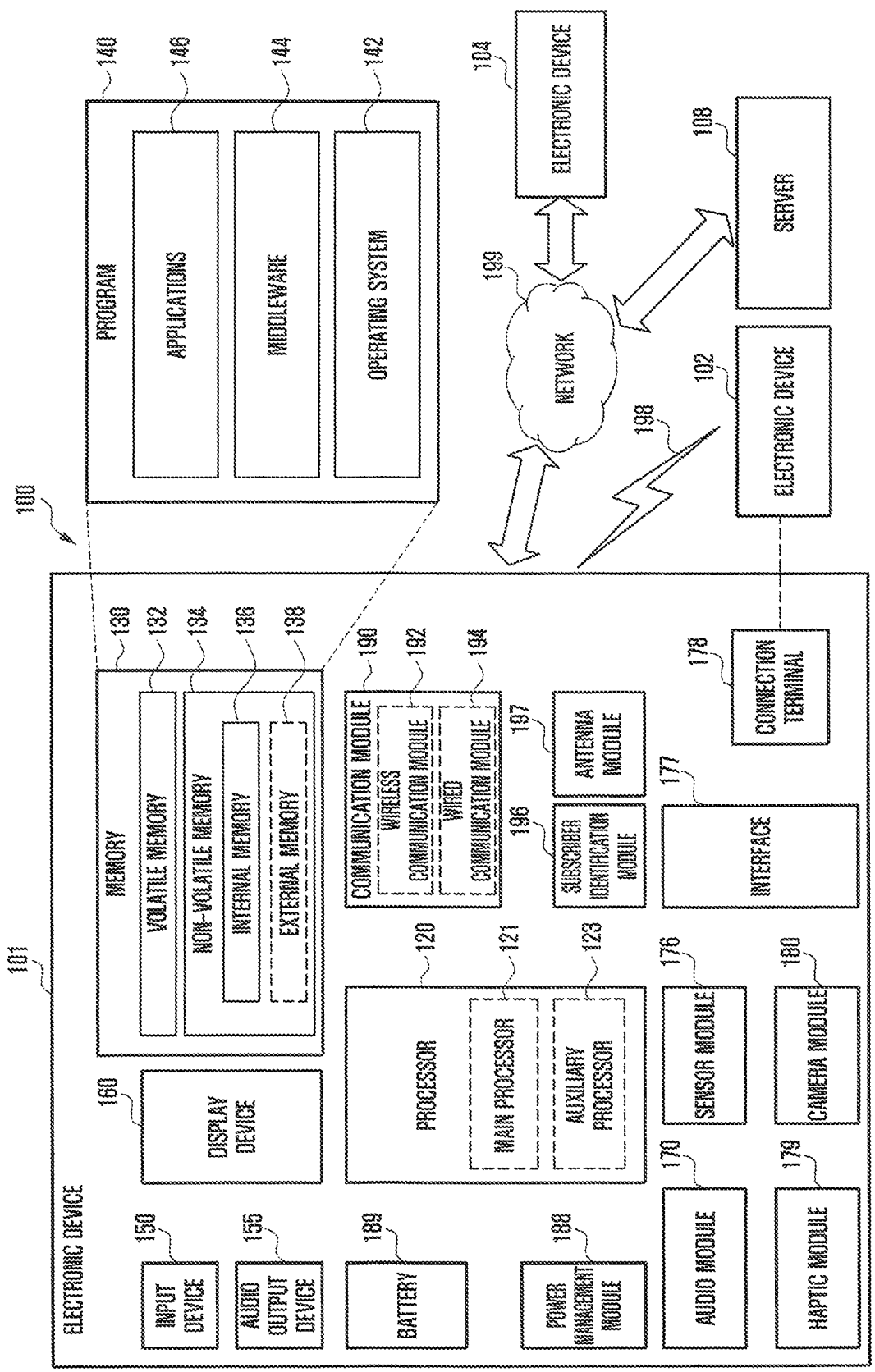
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least on component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101 from the outside (e.g., a user) of the electronic device 101. The input device 150 may include, for example, a microphone, a mouse, or a keyboard.

The sound output device 155 may output sound signals to the outside of the electronic device 101. The sound output device 155 may include, to example, a speaker or a receiver. The speaker may be used for general purposes, such as playing multimedia or playing record, and the receiver may be used for an incoming calls. According to an embodiment, the receiver may be implemented as separate from, or as past of the speaker.

The display device 160 may visually provide information to the outside (e.g., a user) of the electronic device 101. The display device 160 may include, for example, as display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of user) external to the electronic device 101, and then generate al electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLS) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
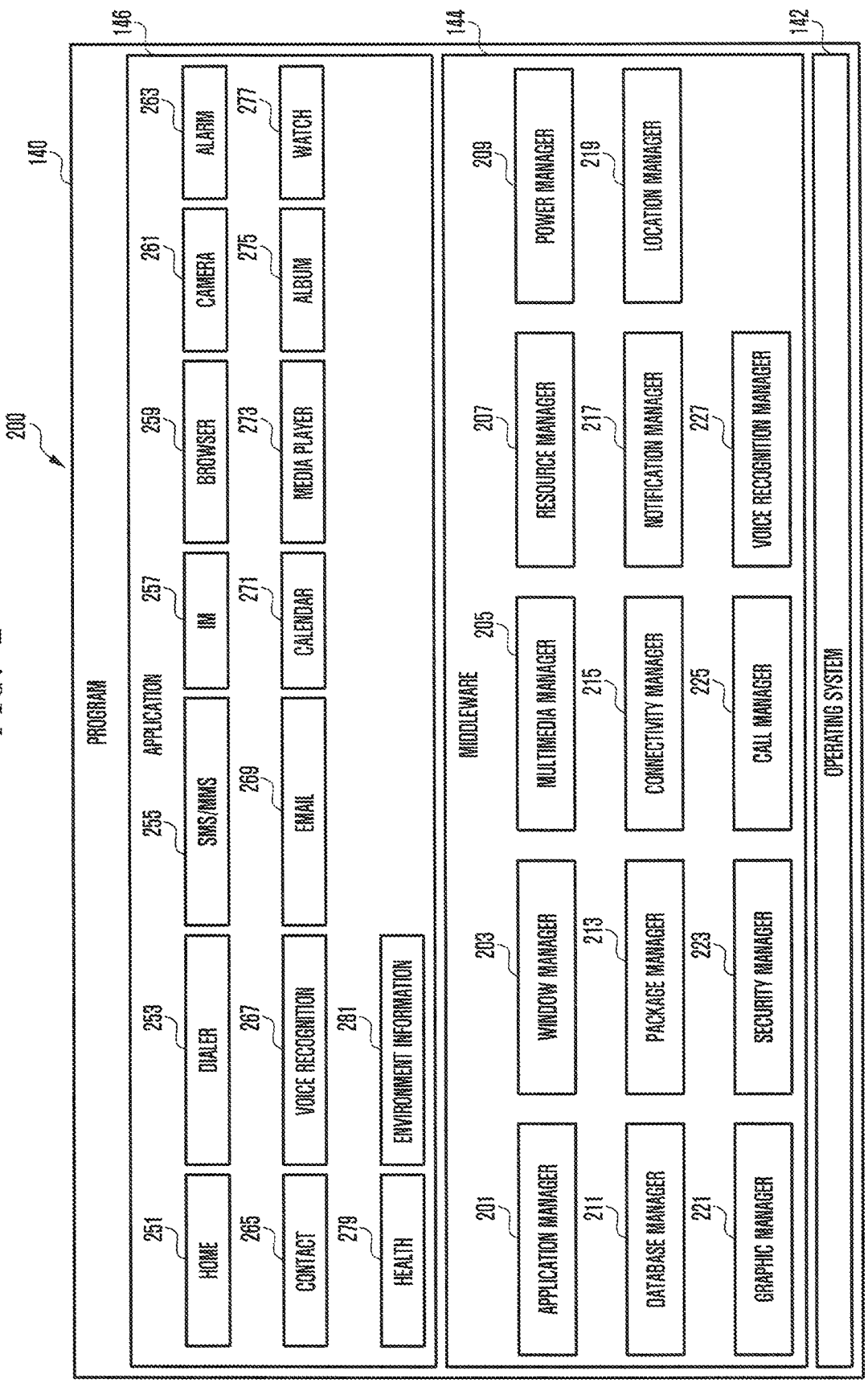
FIG. 2 is a block diagram of a program operating in an electronic device according to various embodiments of the disclosure.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic, device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manage 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an in exchanging application shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 in the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
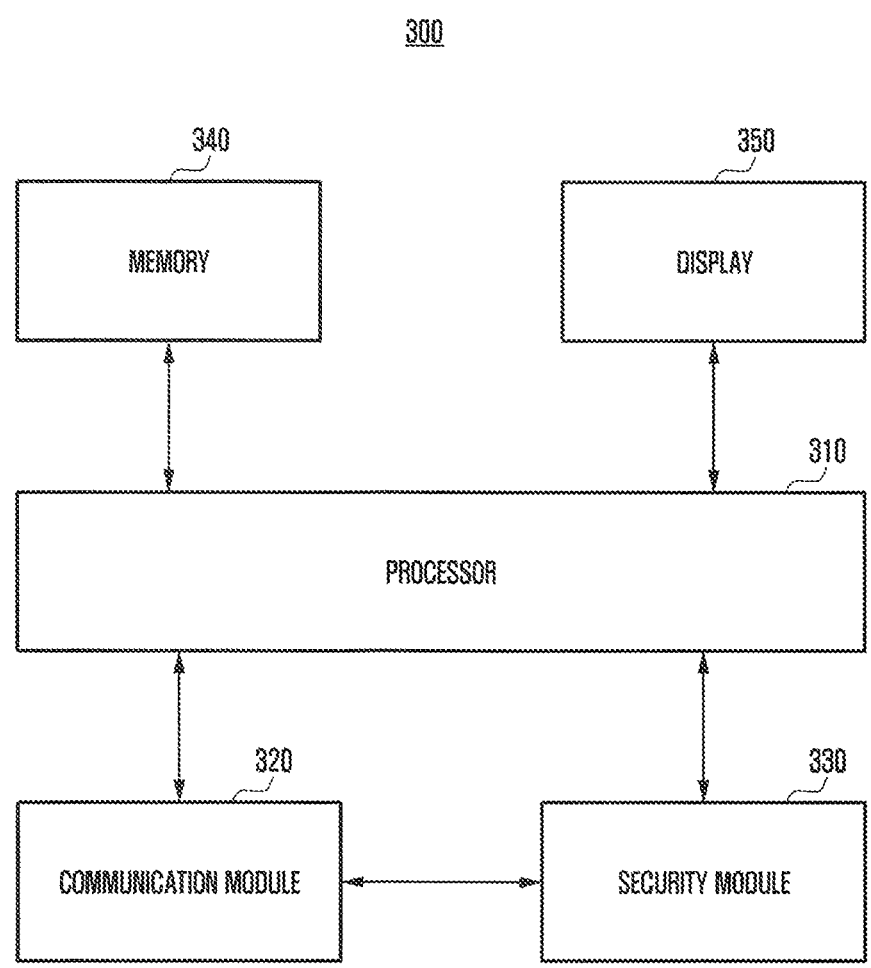
FIG. 3 is a block diagram of an electronic device according to various embodiments of the disclosure.

FIG. 3 is a block diagram of an electronic device according to various embodiments of the disclosure.

Referring to FIG. 3, an electronic device 300 (e.g., the electronic device 101 in FIG. 1) according to various embodiments of the disclosure may include a processor 310 (e.g., the processor 120 in FIG. 1), a communication module 320 (e.g., the communication module 190 in FIG. 1), a security module 330, a memory 340 (e.g., the memory 130 in FIG. 1), and a display 350 (e.g., the display device 160 in FIG. 1).

According to various embodiments of the disclosure, the processor 310 may control the security module 330 so as to change configuration of an applet installed in the security module 330. For example, the processor 310 may display a screen for the user of the electronic device 300 to change the configuration of an applet on the display 350, and may transmit, to the security module 330, a signal requesting changing the configuration of the applet, based on a user input.

Figure 5:
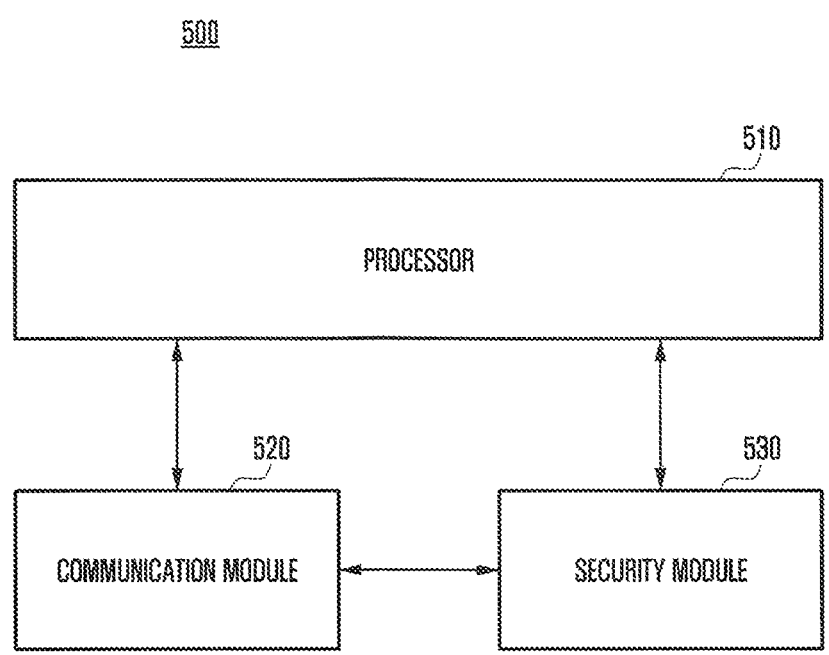
FIG. 5 is a block diagram of an electronic device according to various embodiments of the disclosure.

According to various embodiments of the disclosure, the applet installed in the security module 330 may refer to an applet for performing authentication of the electronic device 300 in order to use various functions provided by an external electronic device (e.g., an electronic device 500 in FIG. 5). For example, the applet may denote a key required to use the external electronic device 500. In the case where the external electronic device 500 is a vehicle, the applet installed in the security module 330 may be an applet that manages a key used for authentication of the vehicle. The applet installed in the security module 330 may be provided by the manufacturer of the external electronic device 500.

According to various embodiments of the disclosure, authentication of the electronic device 300 may denote a procedure of verifying whether or not the electronic device 300 has a valid authority to perform various functions provided by the external electronic device 500. According to various embodiments of the disclosure, the external electronic device 500 may denote a vehicle or any of various electronic devices electrically connected to control the vehicle. The external electronic device 500 will be described in detail below with reference to FIG. 5.

According to various embodiments of the disclosure, the communication module 320 may establish a communication channel with the external electronic device 500, and may transmit and receive a variety of data to and from the external electronic device 500. The communication module 320 may transmit and receive a variety of data to and from the external electronic device 500 using short-range communication (e.g., Bluetooth, NFC, UWB, etc.), but is not limited thereto, and may transmit and receive a variety of data to and from the external electronic device 500 using a cellular network (e.g., LTE, 5G network, etc.).

According to various embodiments of the disclosure, the memory 340 may store an application that configures a key of the external electronic device 500.

According to various embodiments of the disclosure, the security module 330 may be a module that is physically separate from the processor 310 or the memory (e.g., the memory 130 in FIG. 1), and may encrypt and store data that is stored in the security module 330. According to another embodiment of the disclosure, the security module 330 may be included in an area of the memory 340, and the security module 330 may refer to a portion in which data stored in the memory 340 is encrypted and stored.

According to various embodiments of the disclosure, in response to reception of a request for accessing data in the security module 330, the security module 330 may verify the access authority of an entity (e.g., various applications installed in the memory 130 or the like) that requests access to the data or integrity thereof, and may permit access to/editing of the data stored in the security module 330, or may transmit the stored data according to the result of the verification.

According to various embodiments of the disclosure, the security module 330 may include a contactless register service (CRS) for managing an applet used by the external electronic device 500 to perform authentication. The CRS (not shown) may perform modification, addition, or deletion of data assigned to an applet, based on a user request.

According to various embodiments of the disclosure, the security module 330 may include a proximity vehicle key system environment (PVKSE). The PVKSE (not shown) may monitor operations such as modification, addition, or deletion of data assigned to an applet, and if a change in the data related to the applet is detected, may produce information related to the applet, or may change the produced information related to the applet. The PVKSE may refer to an element implemented in software to be separate from the contactless registry service (CRS) for managing data stored in the security module 330.

According to various embodiments of the disclosure, the security module 330 may produce an applet identification (application identification) (AID) list that includes AIDs of the respective applets stored in the security module 330. The AID list may be produced and managed by the PVKSE. The security module 330 may transmit the AID list to the external electronic device 500 in response to a request from the external electronic device 500.

According to various embodiments of the disclosure, the external electronic device 500 may select at least one AID to perform authentication from among the AIDs included in the AID list, and may transmit, to the electronic device 300, information indicating the selected AID and a signal requesting information related to the applet corresponding to the selected AID.

According various embodiments of the disclosure, the signal transmitted by the external electronic device 500 may use a message structure including a command header and a command body defined in Table 60 of ISO 7816-4 (refer to Table 1).

TABLE 1

| | Code | Value |
|---|---|---|
| Command head | CLA (defined in 5.4.1 of 7816.4) | 00 |
| | INS | A4 |
| | P1 (defined in Table 62 of ISO 7816.4) | 04 |
| | P2 | 00 |
| Command body | Lc (Length of command data field) | 0d |
| | Data (2VK.SYS.DDF01) | 32564B2E5359532E4444463031 |
| | Le | 00 |

According to various embodiments of the disclosure, in response to reception of information indicating the selected AID and information related to the applet corresponding to the selected AID transmitted by the external electronic device 500, the security module 330 may transmit information related to the applet corresponding to the selected AID to the external electronic device 500.

According to various embodiments of the disclosure, information related to the applet transmitted to the external electronic device 500 by the security module 330 may use a template for file control information (FCI) defined in ISO 7816-4.

TABLE 2

| TAG | | | Values | Y |
|---|---|---|---|---|
| '6F' | FCI Template (indicating template for file control information) | | | Y |
| | '84' | '2VK.SYS.DDF01' | | Y |
| | 'A5' | FCI Proprietary Template | | Y |
| | | 'BF0C' | FCI Issue Discretionary Data (indicating issued discretionary data of security module 330) | Y |
| | | | '61' Directory Entry (indicating stored address of applet) | Y |
| | | |     '4F' DF Name (AID) (indicating applet identification) | Y |
| | | |     '50' Application label (applet labeling) | N |
| | | |     '87' Priority indicator (highest) (indicating priority) | N |
| | | |     '9F30' Application-specific data (specific data) | N |
| | | | . . . | |
| | | | '61' Directory Entry | N |
| | | |     '4F' DF Name (AID) | N |
| | | |     '50' Application label | N |
| | | |     '87' Priority indicator (lowest) | N |
| | | |     '9F30' Application-specific data | N |

Referring to Table 2, information related to the applet may be implemented in the form of data and a tag indicating the data. In addition, an item indicating the length of data may be added between the tag and data. In the case where a plurality of AIDS is selected by the external electronic device 500, the information related to the applet may include all information related to the applets corresponding to the respective AIDs. If there is a plurality of AIDs, information related to the applets corresponding to the respective AIDs may be transmitted in order of priority. The priority may be configured by the user of the electronic device 300. In addition, the priority may be changed depending on the frequency of use of the external electronic device 500. For example, the higher the frequency of use of the external electronic device 500, the higher the priority may be configured.

According to various embodiments of the disclosure, the information related to the applet may include an applet identification 4F indicating the identifier of a manufacturer of the external electronic device, an applet label 50 indicating the model of the external electronic device, priority information 87 indicating the priority of the applet, or application-specific data 9F30.

According to various embodiments of the disclosure, among the information related to the applet, information 6F indicating a template for file control information, a data field 84, a file control information (FCI) proprietary template A5, a portion BF0C indicating issued discretionary data of the security module 330, a portion 61 indicating a stored address of the applet, or an application identification 50 may correspond to an essential element of the information related to the applet. An applet label 50 indicating the model of the external electronic device, priority information 87 indicating the priority of the applet, or application-specific data 9F30 may correspond to an additional element of the information related to the applet.

According to various embodiments of the disclosure, the information related to the applet may include data indicating the state of the applet at the end of the application-specific data 9F30.

According to various embodiments of the disclosure, the applet identification 4F may refer to an identifier capable of distinguishing between the applets. For example, the applet identification may denote an identifier of the manufacturer of the external electronic device 500. The identifier of the manufacturer of the external electronic device may be different between respective manufacturers. The external electronic device 500 may identify the applet identification 4F, and may select an AID corresponding to the same manufacturer as the manufacturer of the external electronic device 500.

According to various embodiments of the disclosure, the applet label 50 may refer to an identifier of a model of the external electronic device or an identifier of the manufacturer of the external electronic device. Even if the external electronic device is manufactured by the same manufacturer, the applet label 50 may be different depending on the model thereof (a mid-sized car or a full-sized car).

According to various embodiments of the disclosure, the priority information 87 may refer to information on the priority related to the order in which the external electronic device 500 performs authentication. The priority information 87 may be implemented as a number, and the smaller the number, the higher priori it may have.

According to various embodiments of the disclosure, the application-specific data 9F30 is an area in which a variety of data on the applet may be included, and a variety of data required for authentication between the external electronic device 500 and the electronic device 300 may be included therein. The application-specific data 9F30 may include an available usage time of the external electronic device 500 (e.g., the time during which driving of the external electronic device 500 is allowed), geofencing limitation data of the external electronic device 500 (e.g., a geographic range in which driving of the external electronic device 500 is allowed), the maximum permissible speed of the external electronic device 500, data indicating whether or not various devices included in the external electronic device 500 (e.g., a trunk, a console box, and the like) or various functions available for the external electronic device 500 (e.g., lane maintenance assistance, lane departure notification, cruise control, adaptive cruise control, or engine availability) are allowed, and the like.

According to various embodiments of the disclosure, referring to Table 3, data indicating the state of the applet may indicate one of three states (the state indicating the occurrence of an error in a message requesting information related to the applet, the state indicating that there is no applet, and the state indicating the success of transmission of in related to the applet) in a rough way.

TABLE 3

| Field | Length | Value | | |
|---|---|---|---|---|
| Status Word | 2 | Status Word | | |
| | | Value | Type | Meaning |
| | | '6A86' | Error | Incorrect P1/P2 |
| | | '6A82'' | Error | Application not found |
| | | '9000' | Normal | Successful Processing |

The signal, produced with reference to Table 1, through which the external electronic device 500 makes a request to the electronic device 300 for the AID list, may be implemented as, for example, '00A404000D32564B2E5359532E444446303100'. The data related to the applet transmitted from the electronic device 300 to the external electronic device 500 may be implemented according to the above description, and a specific example thereof will be shown in FIG. 10.

Referring to FIG. 10, the data related to the applet may be implemented as shown in Table 4 using the format defined in Table 2. Table 4 is a specific example of data related to the applet implemented using the format defined in Table 2, and provides a detailed description of the data related to the applet shown in FIG. 10.

TABLE 4

| Tag | | | | Description | Example |
|---|---|---|---|---|---|
| '6F' | | | | FCI Template (indicating template for file control information) | 6F |
| | '84' | | | '2VK.SYS.DDF01' | 32564B2E5 359532E444 4463031 |
| | 'A5' | | | FCI Proprietary Template | A5 |
| | | 'BF0C' | | FCI Issue Discretionary Data (indicating issued discretionary data of security module 330) | BF0C |
| | | | '61' | Directory Entry (indicating stored address of applet) | 61 |
| | | | '4F' | DF Name (AID) (indicating applet identification) | D286000159 01140001 |
| | | | '50' | Application label (applet labeling) | 424D57205835 |
| | | | '87' | Priority indicator (highest) (indicating priority) | 01 |
| | | | '9F30' | Application-specific data (specific data) | — |

According to various embodiments of the disclosure, the external electronic device 500 may perform authentication for the electronic device 300 using data related to the applet transmitted from the electronic device 300. In response to the completion of authentication of the electronic device 300, the external electronic device 500 may provide functions that can be performed by the external electronic device 500 within an authenticated range. For example, in response to the completion of authentication of the electronic device 300, the external electronic device 500 may release the door lock of the external electronic device 500, and may release the on/off control lock for start-up of the external electronic device 500.

According to various embodiments of the disclosure, information related to the applet used in authentication of the external electronic device 500 may be stored in the security module 330 of the electronic device 300. The security module 300 may provide a separate security solution so that information related to security-sensitive applets may be safely stored, and may be safely used. A detailed example in which the information related to the applet is stored in the security module 330 will be described below with reference to FIG. 4.

Figure 4:
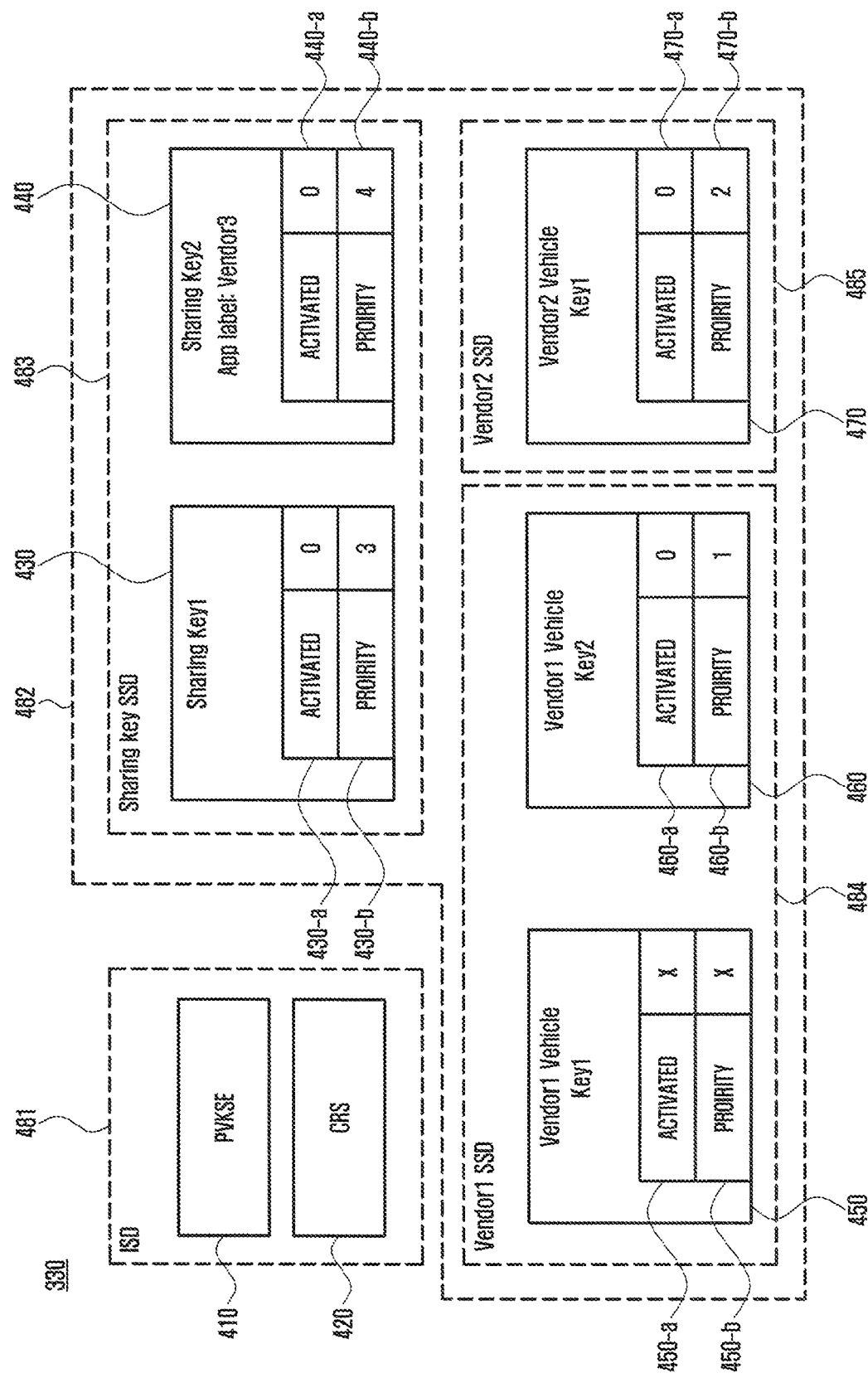
FIG. 4 is a block diagram illustrating a security module in an electronic device according to various embodiments of the disclosure.

FIG. 4 is a block diagram illustrating a security module in an electronic device according to various embodiments of the disclosure.

Referring to FIG. 4, the security module 330 of the electronic device 300 according to various embodiments of the disclosure may be divided into an issued security domain (ISD) 481 and a supplementary security domain (SSD) 482.

According to various embodiments of the disclosure, a PVKSE 410 and a CRS 420 may be provided in the ISD 481. The PVKSE 410 may refer to a software element capable of managing at least one applet 430, 440, 450, 460, or 470 installed in the SSD 482. The security module 330 according to various embodiments of the disclosure may include the CRS 420 that manages at least one applet 430, 440, 450, 460, or 470, and may manage at least ore applet 430, 440, 450, 460, or 470 under the control of the CRS 420.

According to various embodiments of the disclosure, the CRS 420 may denote a software element that manages files installed in the security module 330. The CRS 420 may manage a variety of data stored in the security module 330 (e.g., encryption of data or decryption of encrypted data), based on a request by a processor (e.g., the processor 310 in FIG. 3), and may transfer the data stored in the security module 330 to a memory (e.g., the memory 130 in FIG. 1).

In order to perform authentication of the electronic device 300, the external electronic device 500 may make a request to the electronic device 300 for transmitting an AID list stored in the security module 330. For example, the transmission of the AID list stored in the security module 330 may be performed using an instruction defined as SELECT PVKSE. The PVKSE 410 may produce and transmit an AID list in response to reception of the instruction defined as SELECT PVKSE.

According to various embodiments of the disclosure, the PVKSE 410 may monitor changes in a variety of data on the applet, and if a change in the data is detected, may produce or change information related to the applet reflecting the change in the data. In response to a request from the external electronic device 500, the VKSE 410 may transmit information related to the applet corresponding to at least one AID selected by the external electronic device 500.

According to various embodiments of the disclosure, the external electronic device 500 may transmit, to the security module 330, information indicating the selected AID using an instruction defined as SELECT AID. For example, in response to the reception of the instruction defined as SELECT AID, the PVKSE 410 of the security module 330 may transmit information related to the applet corresponding to the at least one AID selected by the external electronic device 500.

According to various embodiments of the disclosure, each of the one or more applets 430, 440, 450, 460, and 470 may be stored in the SSD 482. The SSD 482 may be divided into spaces according to manufacturers of the external electronic device 500, and the applets corresponding to respective manufacturers may be stored in the corresponding spaces of the SSD 482 divided for the respective manufacturers. For example, the applets 450 and 460 corresponding to manufacturer 1 may be stored in an SSD space 484 corresponding to manufacturer 1, and the applet 470 corresponding to manufacturer 2 may be stored in an SSD space 485 corresponding to manufacturer 2. The SSD 482 may further include an SSD space 483 for separately storing the applets 430 and 440 for sharing keys available for the external electronic device shared by various users (e.g., a vehicle that is a target to be shared as car sharing).

According to various embodiments of the disclosure, each of the one or more applets 430, 440, 450, 460, and 470 may include data 430-*a*, 440-*a*, 450-*a*, 460-*a*, or 470-*a* indicating whether or not the applet is activated. The activated applet (e.g., 430, 440, 460, or 470) may denote an applet capable of performing authentication of the electronic device 300 with the external electronic device 500, and the deactivated applet (e.g., 450) may denote an applet that is unable to perform authentication of the electronic device 300 with the external electronic device 500. Activation or deactivation of the applet may be determined by an input from the user of the electronic device 300, and a detailed description of performing the activation of the applet will be described later with reference to FIG. 8A.

According to various embodiments of the disclosure, each of the one or more applets 430, 440, 450, 460, and 470 may include data 430-*b*, 440-*b*, 450-*b*, 460-*b*, or 470-*b* indicating the priority of the applet. The priority may be configured by the user of the electronic device 300. In addition, the priority may be changed depending on the frequency of use of the external electronic device 500. For example, the higher the frequency of use of the external electronic device 500, the higher the priority may be configured. A detailed description of configuration of the priority of the applet will be described later with reference to FIG. 8B.

According to various embodiments of the disclosure, each of the one or more applets 430, 440, 450, 460, and 470 may include information related to the applet, and the information related to the applet may include an applet identification 4F indicating an identifier of the manufacturer of the external electronic device, an applet label 50 indicating the model of the external electronic device, priority information 87 indicating the priority of the applet, and application-specific data 9F30. The information related to the applet may include data indicating the state of the applet at the end of the application-specific data 9F30.

FIG. 5 is a block diagram of an electronic device according to various embodiments of the disclosure.

Referring to FIG. 5, an electronic device 500 (e.g., the electronic device 102 or the electronic device 104 in FIG. 1) according to various embodiments of the disclosure may include a processor 510, a communication module 520, and a security module 530. The electronic device 500 illustrated in FIG. 5 may be the external electronic device described with reference to FIG. 3. The electronic device 500 may denote a vehicle or any of various electronic devices electrically connected to control the vehicle. It is possible to perform at least some of the various functions that can be performed by the electronic device 500 (e.g., a function of releasing the door lock of the electronic device 500 and a function of starting an engine of the electronic device 500) through authentication of the electronic device 500 shown in FIG. 5 with an external electronic device (e.g., the electronic device 300 illustrated in FIG. 3).

According to various embodiments of the disclosure, the communication module 520 may establish a communication channel with the external electronic device 300, and may transmit and receive a variety of data to and from the external electronic device 300. The communication module 520 may transmit and receive a variety of data to and from the external electronic device 300 using short-range communication (e.g., Bluetooth, NFC, UWB, etc.), but is not limited thereto, and may transmit and receive a variety of data to and from the external electronic device 300 using a cellular network (e.g., LTE, 5G network, etc.).

According to various embodiments of the disclosure, the security module 530 may be a module that is physically separate from the processor 510 or the memory (e.g., the memory 130 in FIG. 1), and may encrypt and store data that is stored in the security module 530. According to another embodiment of the disclosure, the security module 530 may be included in an area of the memory 130, and the security module 530 may refer to a portion in which data stored in the memory 130 is encrypted and stored.

According to various embodiments of the disclosure, in response to reception of a request for accessing data in the security module 530, the security module 530 may verify the access authority of an entity (e.g., various applets installed in the memory 130) that requests access to the data and integrity thereof, and may permit access to/editing of the data stored in the security module 330, or may transmit the stored data according to the result of the verification. The security module 530 may store a variety of data transmitted from the external electronic device 300 {e.g., information related to the applet, applet list, and data required for authentication transmitted by the external electronic device 300 (public key)} or data required for authentication with the external electronic device 300 (a secret key).

According to various embodiments of the disclosure, the processor 510 may control the communication module 520 so as to broadcast a connection request signal for a connection with the external electronic device 300. The processor 510 may establish a communication channel with the external electronic device 300 that responds to the broadcast connection request signal.

According to various embodiments of the disclosure, the processor 510 may receive, from the external electronic device 300, a request signal for activating at least some of the various functions that can be performed by the electronic device 500. For example, the external electronic device 300 may produce a signal making a request for performing some functions of the electronic device 500 (e.g., a function of releasing the door lock of the electronic device 500, a function of turning on the lights of the electronic device 500, or a function of automatically pulling out the electronic device 500), based on an input from the user of the external electronic device 300, and may transmit the produced signal to the electronic device 500. In response to reception of the signal making a request for performing some functions of the electronic device 500, the processor 510 may initiate authentication with the external electronic device 300. In the case where there is a plurality of applets installed in the external electronic device 300 (which may denote the applets for authentication with the electronic device 500), if authentication is performed on the respective applets, it may take a long time for authentication. According to various embodiments of the disclosure, the processor 510 may transmit, to the external electronic device 300, a signal making a request for transmitting an AID list before performing authentication, instead of performing authentication for all of the plurality of applets.

According to various embodiments of the disclosure, the signal requesting the AID list may be implemented us the message structure shown in Table 1.

According to various embodiments of the disclosure, the processor 510 may select at least one AID from among the AIDs included in the AID list transmitted from the external electron device 300.

According to various embodiments of the disclosure, the processor 510 may select AIDs in a manner of selecting one or more AIDs remaining after filtering out applets having AIDs that are not supported by the electronic device 500 from among the AIDs included in the AID list.

According to another embodiment of the disclosure, the processor 510 may select AIDs in a manner of selecting applets having the same AID as the manufacturer of the electronic device 500 from among the AIDS included in the AID list.

According to another embodiment of the disclosure, the processor 510 may select AIDs in a manner of selecting applets having the same AID as the manufacturer of the electronic device 500 from among the AIDS included in the AID list and selecting one or more AIDs remaining after filtering out the applets having AIDs that are not supported by the electronic device 500 from among the AIDs corresponding to a sharing key.

According to various embodiments of the disclosure, the processor 510 may transmit information indicating the selected AIDs to the external electronic device 300. For example, the processor 510 may produce a list of the selected AIDs, and may transmit the produced AID list to the external electronic device 300.

According to various embodiments of the disclosure, the processor 510 may transmit a signal requesting information related to the applet corresponding to at least one selected AID to the external electronic device 300. The information related to the applet may be implemented using a template for control information defined in ISO 7816-4, and is shown in Table 2. The information related to the applet may include an applet identification 4F indicating an identifier of the manufacturer of the external electronic device, an applet label 50 indicating the model of the external electronic device, priority information 87 indicating the priority of the applet, and application-specific data 9F30. The information related to the applet may include data indicating the state of the applet at the end of the application-specific data 9F30. The detailed description of the information related to the applet has been made with reference to FIG. 3.

According to various embodiments of the disclosure, the processor 510 may receive the information related to the applet from the external electronic device 300. The processor 510 may perform authentication with the external electronic device 300 using the information related to the applet.

According to various embodiments of the disclosure, the processor 510 may determine the applet on which authentication is preferentially performed based on the priority information included in the information related to the applet. For example, if the processor 510 selects a plurality of AIDS, the processor 510 may priority information corresponding to each of the plurality of AIDs. The processor 510 may perform authentication with the external electronic device 300 using an applet having the highest priority. If the processor 510 fails to perform authentication while performing authentication with the external electronic device 300 using the applet having the highest priority, the processor 510 may perform authentication with the external electronic device 300 using an applet having the next highest priority.

The electronic device 500 according to various embodiments of the disclosure may receive an AID list, may select applets by which authentication is to be performed from the AID list, and may then perform authentication using the selected applets, instead of performing authentication for all of the applets stored in the external electronic device 300. If authentication with the external electronic device 300 having a plurality of applets is performed using the method described above, the time required for authentication may be reduced.

According to various embodiments of the disclosure, at least some of the functions performed by the processor 510 may also be performed by the security module 530.

In response to completion of authentication of the external electronic device 300, the electronic device 500 may provide functions that can be performed by the electronic device 500 within an authenticated range. For example, in response to completion of authentication of the external electronic device 300, the electronic device 500 may release the door lock of the electronic device 500, and may release the on/off control lock of startup of the electronic device 500.

An electronic device according to various embodiments of the disclosure may include: a communication module (e.g., the communication module 320 in FIG. 3) configured to communicate with an external electronic device; and a security module (e.g., the security module 330 in FIG. 3) configured to monitor a change in data related to applets for managing keys used for authentication of the external electronic device, manage information related to the applet, and store an applet identification (AID) list including one or more AIDs and the applets, wherein the security module may be configured to receive, from the external electronic device (e.g., the electronic device 400 in FIG. 4), a signal making a requester transmitting the AID (application identifier) list, in response to reception of the request signal, transmit the AID list to the external electronic device 400 through the communication module 320, receive, from the external electronic device 400, a signal requesting information related to an applet associated with at least one AID selected from among the AIDs included in the AID list by the external electronic device 400, and transmit the information related to the applet corresponding to the selected AID to the external electronic device 400.

According to various embodiments of the disclosure, the information related to the applet may include at least one of an address in which the applet is stored, the AID, a model identifier of the external electronic device, data indicating whether or not to activate the applet, priority assigned to each of the applets, or application-specific data.

According to various embodiments of the disclosure, the application-specific data may include an available usage time of the external electronic device, geofencing limitation data of the external electronic device, or information indicating whether or not at least one of various functions that can be executed by the external electronic device is allowed.

According to various embodiments of the disclosure, the AID list may be sorted based on the priority assigned to each of the applets.

According to various embodiments of the disclosure, the security module 330 may further include: a CRS (e.g., the CRS 420 in FIG. 4) configured to manage data stored in the security module; and a proximity vehicle key system environment (PVKSE) (e.g., the PVKSE 410 in FIG. 4) configured to monitor a change in data related to the applet and manage information related to the applet, wherein the CRS 420, in response to a signal making a request for changing configuration of the applet, may change configuration of at least one applet and transmit a signal indicating the change in the data to the PVKSE 410, and wherein the PVKSE 410, in response to reception of the signal indicating the change in the data, may change the data related to the applet.

According to various embodiments of the disclosure, the PVKSE 410 and the CRS 420 may be configured to be stored in an issued security domain (e.g., the ISD 481 in FIG. 4) of the security module, and the applet may be configured to be stored in a supplementary security domain (e.g., the SSD 482 in FIG. 4) thereof.

According to various embodiments of the disclosure, the information related to the applet may be configured to be stored in a supplementary secure domain separated for each applet.

According to various embodiments of the disclosure, the PVKSE 410 may be configured to change the information related to the applet if a change in the applet is detected.

An electronic device according to various embodiments of the disclosure may include: a memory; a security module (e.g., the security module 530 in FIG. 5) configured to store data used for authentication with an external electronic device; a communication module (e.g., the communication module 520 in FIG. 5); and a processor (e.g., the processor 510 in FIG. 5), wherein the security module 530 may be configured to broadcast a connection request signal for a connection with the external electronic device (e.g., the electronic device 300 in FIG. 3); establish a communication channel with the external electronic device 300 that responds to the broadcast signal; transmit a signal making a request for transmitting an AID list including one or more AIDs (application identifiers) stored in the external electronic device 300; select at least one AID from among the AIDs included in the AID list transmitted by the external electronic device 300; transmit, to the external electronic device 300, information indicating an applet corresponding to the selected AID and a signal requesting information related to the applet and perform authentication with the external electronic device using the information related to the applet received from the external electronic device 300.

According to various embodiments of the disclosure, the security module 530 may be configured to perform authentication, based on the priority assigned to the applet.

According to various embodiments of the disclosure, the security module 530 may be configured to perform authentication for the external electronic device 300 using the information related to the applet, in response to identifying that the authentication has failed, select an AID having a lower priority than the AID on which the authentication has been performed, and request information related to an applet corresponding to the selected AID.

According to various embodiments of the disclosure, the security module 530 may be configured to select an AID corresponding to a manufacturer of the electronic device 400 from among the AIDs included in the AID list.

According to various embodiments of the disclosure, the security module 530 may be configured to select an AID having the highest priority from AIDs corresponding to manufacturer of the electronic device 400, among the AIDs included in the AID list.

According to various embodiments of the disclosure, the AID list may include at least one AID corresponding to the external electronic device 300 and at least one AID corresponding to an external electronic device 300 shared by other users.

According to various embodiments of the disclosure, the information related to the applet may include at least one of an address in which the applet is stored, the AID, a model identifier of the electronic device 400, data indicating whether or not to activate the applet, priority assigned to each applet, or application-specific data.

According to various embodiments of the disclosure, the application-specific data may include an available usage time of the electronic device 400, geofencing limitation data of the electronic device 400, or information indicating whether or not at least one of various functions that can be executed by the electronic device 400 is allowed.

According to various embodiments of the disclosure, the security module 530 may be configured to determine a function to be activated among functions that can be provided by the electronic device 400, based on the application-specific data.

According to various embodiments of the disclosure, the electronic device 400 may be a vehicle, or may be electrically, connected to a vehicle.

Figure 6:
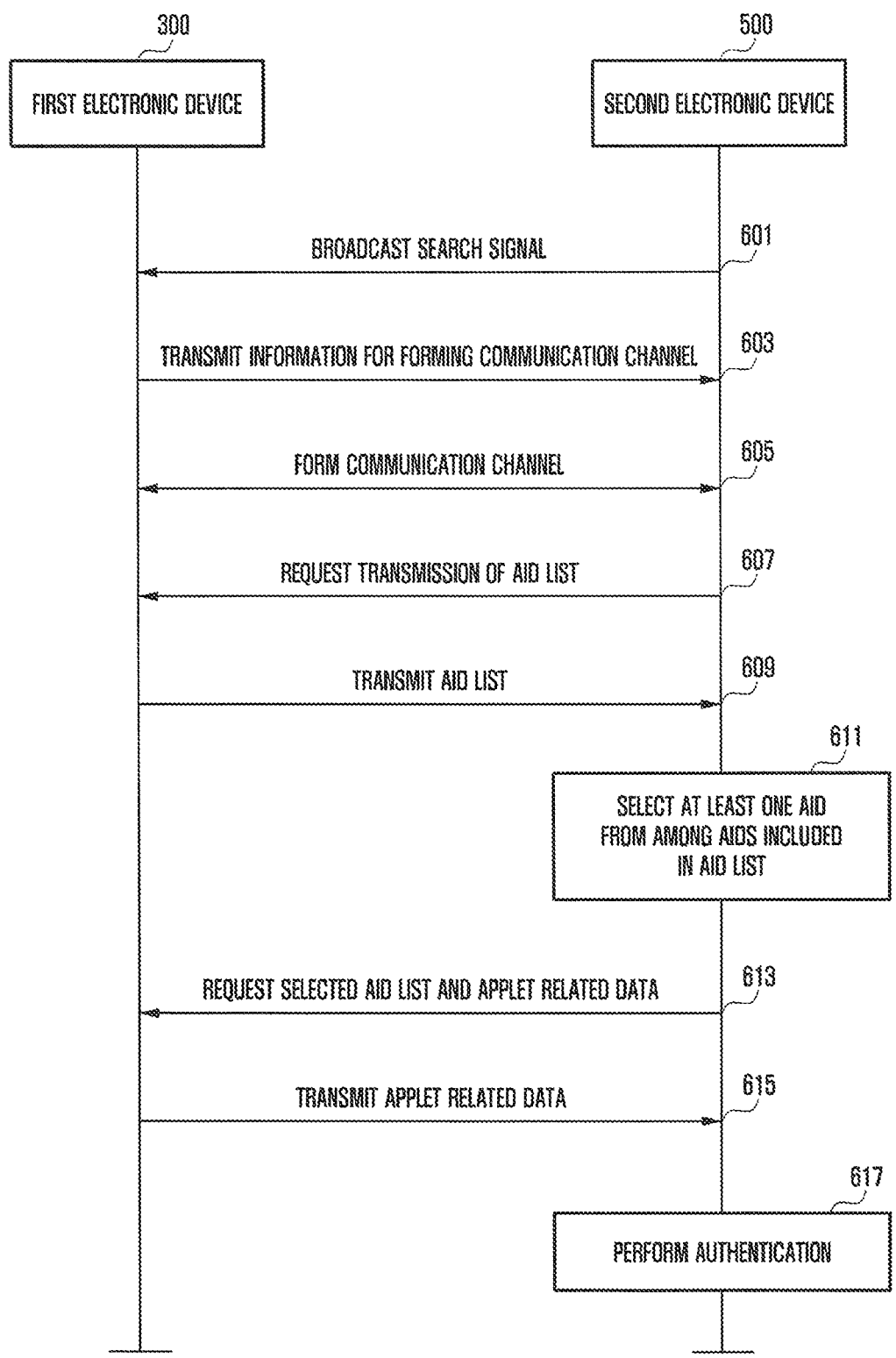
FIG. 6 is an operational flowchart of an operating method of an electronic device according to various embodiments of the disclosure.

FIG. 6 is an operational flowchart illustrating an operating method of an electronic device according to various embodiments of the disclosure.

Referring to FIG. 6, an operating method of an electronic device according to various embodiments of the disclosure may be performed between a first electronic device (e.g., the electronic device 300 in FIG. 3) and a second electronic device (e.g., the electronic device 500 in FIG. 5).

In operation 601, the second electronic device 500 may broadcast a discovery signal. In operation 603, the first electronic device 300 may receive the discovery signal, and may transmit information for establishing a communication channel to the second electronic device 500. In operation 605, the second electronic device 500 may establish a communication channel with the first electronic device 300 that responds to the discovery signal. According to various embodiments of the disclosure, the communication channel may refer to a channel implemented between the first electronic device 300 and the second electronic device 500 using a short-range communication method, but the communication channel may also be implemented using a cellular network communication method.

In operation 607, the second electronic device 500 may transmit, to the first electronic device 300, a signal making a request for transmitting an AID list for authentication with the first electronic device 300.

According to various embodiments of the disclosure, the second electronic device 500 may receive, from the first electronic device 300, a request signal for activating at least some of the various functions that can be performed by the second electronic device 500. In response to reception of the request signal for activating at least some of the functions, the second electronic device 500 may transmit, to the first electronic device 300, a signal making a request for transmitting an AID list.

In operation 609, the first electronic device 300 may transmit an AID list to the second electronic device 500 in response to the request for transmission of the AID list. The AID list may include a list of identifications of respective applets stored in the security module (e.g., the security module 330 in FIG. 3) of the first electronic device 300. The applet may include a variety of information for performing authentication between the first electronic device 300 and the second electronic device 500.

In operation 611, the second electronic device 500 may select at least one AID from the AIDs included in the AID list.

According to various embodiments of the disclosure, the second electronic device 500 may select AIDs in a manner of selecting one or more AIDs remaining after filtering out applets having AIDs that are not supported by the second electronic device 500 from among the AIDS included in the AID list.

According to an embodiment of the disclosure, the second electronic device 500 may select AIDS in a manner of selecting applets having the same AID as the manufacturer of the second electronic device 500 from among the AIDs included in the AID list.

According to an embodiment of the disclosure, the second electronic device 500 may select AIDs in a manner of selecting applets having the same AID as the manufacturer of the second electronic device 500 from among the AIDS included in the AID list and selecting one or more AIDs remaining after filtering out the applets having AIDs that are not supported by the second electronic device 500 from among the AIDs corresponding to a sharing key.

In operation 613, the second electronic device 500 may transmit, to the first electronic device 300, a list of the selected AIDs and a signal making a request for transmitting data related to the applets corresponding to the selected AIDs, respectively. In operation 615, the first electronic device 300 may transmit data related to the applets to the second electronic device 500.

According to various embodiments of the disclosure, the information related to the applet may be implemented using a template for file control information defined in ISO 7816-4, and is shown in Table 2. The information related to the applet may include an applet identification 4F indicating an identifier of the manufacturer of an external electronic device, an applet label 50 indicating the model of an external electronic device, priority information 87 indicating the priority of the applet, and application-specific data 9F30. The information related to the applet may include data indicating the state of the applet at the end of the application-specific data 9F30. The detailed description of the information related to the applet has been described with reference to FIG. 3.

In operation 617, the second electronic device 500 may perform an authentication procedure with the first electronic device 300 using the information related to the applets.

The second electronic device 500 according to various embodiments of the disclosure may receive an AID list, may select applets on which authentication is to be performed from the AID list, and may then perform authentication using the selected applets, instead of performing authentication for all of the applets stored in the first electronic device 300. In the case of performing authentication with the first electronic device 300 having a plurality of applets using the method described above, the time required for authentication may be reduced.

According to various embodiments of the disclosure, in response to completion of authentication of the first electronic device 300, the second electronic device 500 may provide functions that can be performed by the second electronic device 500 within an authenticated range. For example, in response to completion of authentication of the first electronic device 300, the second electronic device 500 may release the door lock of the second electronic device 500, and may release the on/off control lock of start-up of the second electronic device 500.

Figure 7:
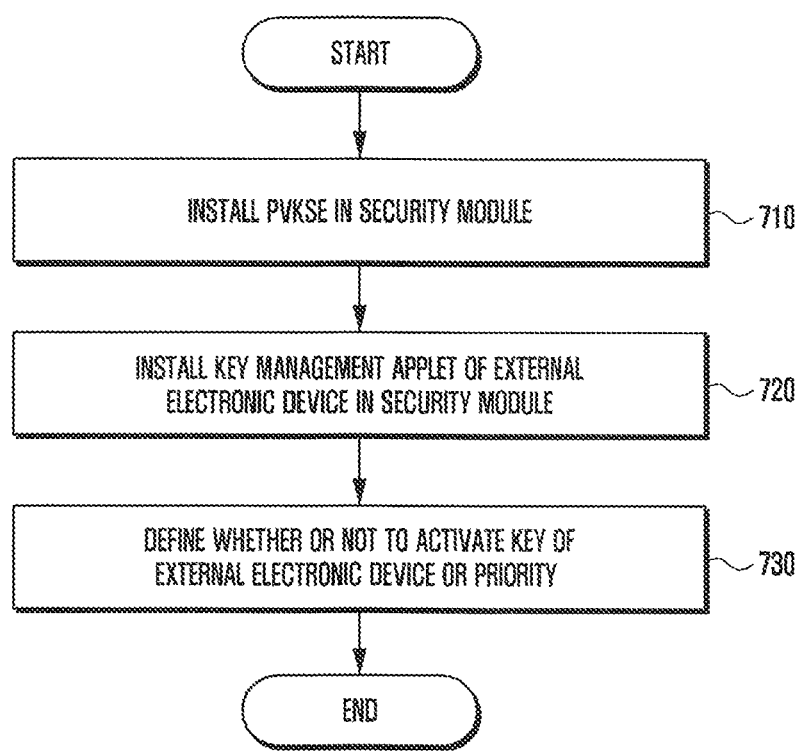
FIG. 7 is an operational flowchart illustrating an operation of installing an applet used for authentication of an electronic device in a security nodule in an operating method of an electronic device according to various embodiments of the disclosure.

FIG. 7 is an operational flowchart illustrating an operation of installing an applet used for authentication of an electronic device in a security module in an operating method of an electronic device according to various embodiments of the disclosure.

The operation illustrated in FIG. 7 shows an operation of installing an applet for performing authentication with an external electronic device (e.g., the electronic device 500 in FIG. 5) and a PVKSE (e.g., the PVKSE 410 in FIG. 4) for managing the applet in a security module (e.g., the security module 330 in FIG. 3) of an electronic device (e.g., the electronic device 300 in FIG. 3).

In operation 710, a processor the processor 310 in FIG. 3) may install the PVKSE 410 in the security module 330. According to various embodiments of the disclosure, the PVKSE 410 may be installed in the ISD 481 of the security module 330. As the applet for configuring a key of the external electronic device 500 is installed in the memory (e.g., the memory 130 in FIG. 1), the PVKSE 410 may be installed in the ISD 481 when the key of the external electronic device 500 is installed in the SSD 482 of the security module 330.

According to various embodiments of the disclosure, the PVKSE 410 may be pre-installed during the manufacturing of the electronic device 300, and in this case, operation 710 may be omitted.

In operation 720, the CRS 420 may install an applet related to the key used for authentication of the external electronic device 500 in the security module 330.

According to various embodiments of the disclosure, the PVKSE 410 may receive a message defined in the form shown in Table 5 below, and the CRS 420 may install the applet in the SSD 482 of the security module 330 using the received message.

TABLE 5

| Tag | Length | Value Description |
|---|---|---|
| '4F' | AID Length of PVKSE | AID of PVKSE |

Referring to Table 5, the message received by the PVKSE 410 may include a tag 4F indicating addition of an applet, the length of an AID, and an AID. According to various embodiments of the disclosure, the PVKSE 410 may receive an applet label, applet priority, and application-specific data, as well as the AID, and the CRS 420 may add the received data to the SSD 482. Table 6 below shows a specific example of the message received by the PVKSE 410 for installing the applet.

TABLE 6

```
...
A3 0F /
    4F 0D 32564B2E5359532E4444463031 //Add the PVKSE to the
    CREL list
A6 19 /
    BF0C 16 /
        61 14 /
            4F    09    D28600015901140001            //
            AID=
D28600015901140001
            50 06 424D57205835// Application Label =
            'BMW X5'
            87 01 01 / Priority indicator = 01
...
```

In operation 730, the CRS 420 may define whether or not to activate the applet of the external electronic device 500 or the priority of the applet. A description of operation 730 will be made below with reference to FIGS. 8A and 8B.

Figure 8A:
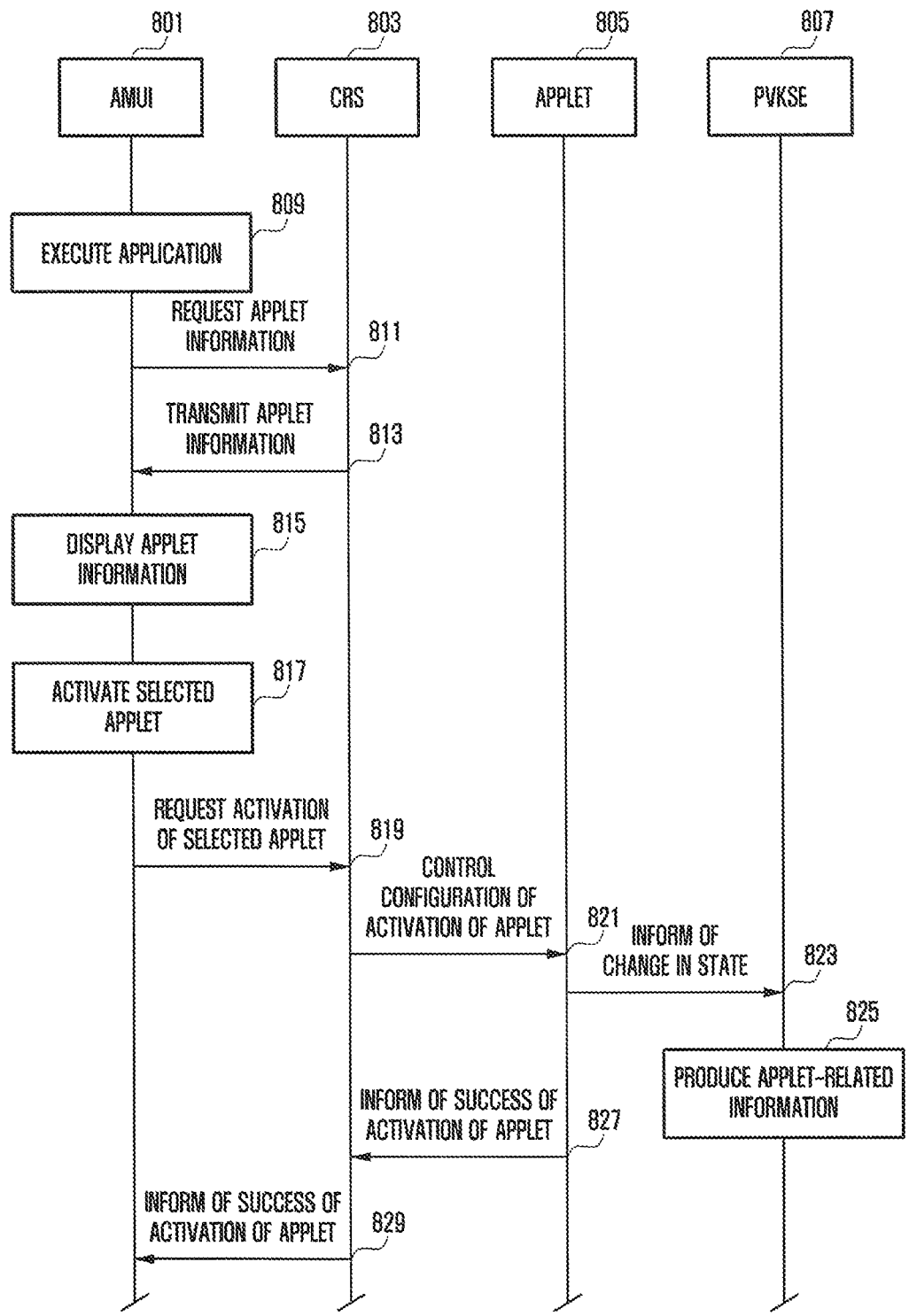
FIG. 8A is an operational flowchart illustrating an operation of activating an applet used for authentication of an electronic device in an operating method of an electronic device according to various embodiments of the disclosure.

FIG. 8A is an operational flowchart illustrating an operation of activating an applet used for authentication of an electronic device in an operating method of an electronic device according to various embodiments of the disclosure.

Referring to FIG. 8A, an operation of activating or deactivating an applet used for authentication of an electronic device (e.g., the electronic device 300) may be performed through the operation of an application management user interface (AMUI) 801, a contactless register service (CRS) 803, an applet 805, and a PVKSE 807.

According to various embodiments of the disclosure, the AMUI 801 may denote an interface implemented between a user and the applet 805. The interface implemented between the user and the applet 805 may include visual elements, and the user may input a request for activation of the applet 805 through input onto the AMUI 801. The CRS 803 (e.g., the CRS 420 in FIG. 4) may denote an element for managing the files and the applets installed in the security module (e.g., the security module 330 in FIG. 3). The applet 805 (e.g., the applet 430, 440, 450, 460, or 470 in FIG. 4) may denote data used for authentication with the external electronic device (e.g., the electronic device 500 in FIG. 5). The PVKSE 807 (e.g., the PVKSE 410 in FIG. 4) may denote a software element capable of monitoring a change in at least one applet 805 and producing and managing information related to the applet 805.

In operation 809, the AMUI 801 may execute an application that manages a key used for authentication with the external electronic device 500. The application managing the key used for authentication with the external electronic device 500 may be installed in a memory (e.g., the memory 340 in FIG. 3) of the electronic device (e.g., the electronic device 300 in FIG. 3). The execution of the application may be triggered by a user input to the electronic device 300.

In operation 811, the AMUI 801 may make a request to the CRS 803 for applet information 811 used for authentication of the external electronic device 500. In operation 813, the CRS 803 may retrieve the applet information from the SSD of the security module 330 (e.g., the SSD 482 in FIG. 5), and may transmit the applet information based on the retrieved result to the AMUI 801.

In operation 815, the AMUI 801 may display the applet information received from the CRS 803 on a display device (e.g., the display device 160 in FIG. 1). In operation 817, the AMUI 801 may activate an applet selected based on a user selection for the displayed applet information. In applet operation 819, the AMUI 801 may transmit a request for activating the selected applet to the CRS 803.

In operation 821, the CRS 803 may control the applet 805 such that the selected applet is activated. According to various embodiments of the disclosure, the CRS 803 may control the applet 805 such that the selected applet is activated by changing the data indicating activation or deactivation of the applet, which is included the selected applet. The activated applet may refer to an applet capable of performing authentication of the electronic device 300 with the external electronic device 500, and the deactivated applet may refer to an applet that is unable to perform authentication of the electronic device 300 with the external electronic device 500.

In operation 823, the applet 805 may transmit the data indicating a change in the activation state of the applet 805 to the PVKSE 807. In operation 825, the PVKSE 807 may produce or change information related to the applet, based on whether or not the activation state of the applet 805 is changed. For example, if the applet 805 is changed to the activation state, the PVKSE 807 may change the information related to the applet by adding the information on the activated applet 805 (an AID, an applet label, priority information, application-specific data, etc.) to the template shown in Table 2.

In operation 827, the applet 805 may transmit, to the CRS 803, a message indicating the success of the change in the activation state of the applet 805, and in operation 829, the CRS 803 may transmit, to the AMUI 801, the message indicating the success of the change in the activation state of the applet 805.

Figure 8B:
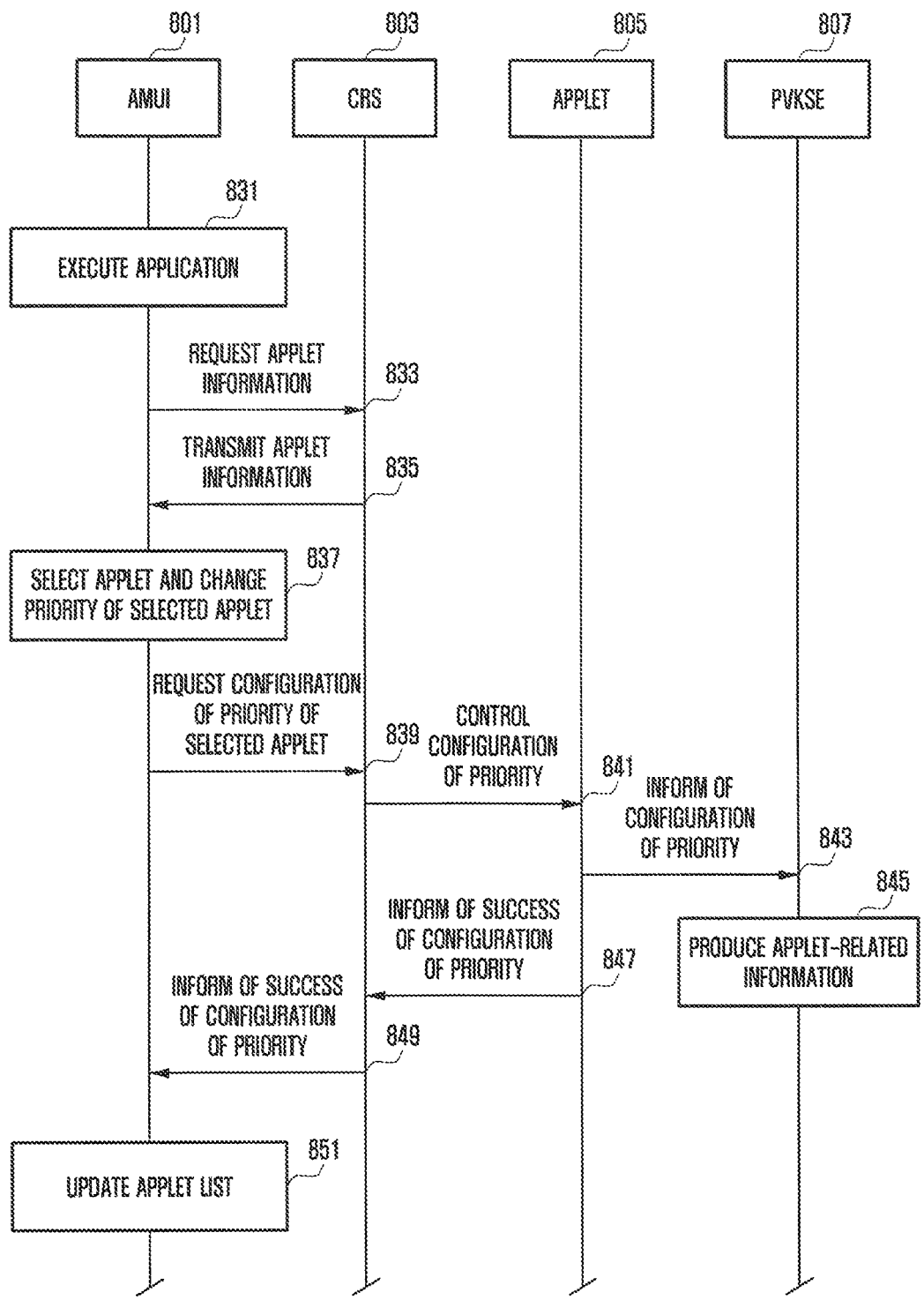
FIG. 8B is an operational flowchart illustrating an operation of configuring priority of applet used for authentication of an electronic device in an operating method of an electronic device according to various embodiments of the disclosure.

FIG. 8B is an operational flowchart illustrating an operation of configuring the priority of an applet used for authentication of an electronic device in an operating method of an electronic device according to various embodiments of the disclosure.

Referring to FIG. 8B, an operation of configuring the priority assigned to an applet used for authentication of an electronic device (e.g., the electronic device 300) may be performed through the operation of an application management user interface (AMUI) 801, a contactless register service (CRS) 803, an applet 805, and a PVKSE 807.

According to various embodiments of the disclosure, the AMUI 801 may denote an interface implemented between a user and the applet 805. The CRS 803 (e.g., the CRS 420 in FIG. 4) may denote an element for managing the files and the applets installed in the security module (e.g., the security module 330 in FIG. 3). The applet 805 (e.g., the applet 430, 440, 450, 460, or 470 in FIG. 4) may denote data used for authentication with the external electronic device (e.g., the electronic device 500 in FIG. 5). The PVKSE 807 (e.g., the PVKSE 410 in FIG. 4) may denote a software element capable of monitoring a change in at least one applet 805 and producing and managing information related to the applet 805.

In operation 831, the AMUI 801 may execute an application that manages a key used for authentication with the external electronic device 500. The application managing the key used for authentication with the external electronic device 500 may be installed in a memory (e.g., the memory 340 in FIG. 3) of the electronic device (e.g., the electronic device 300 in FIG. 3). The execution of the application may be triggered by a user input to the electronic device 300.

In operation 833, the AMUI 801 may make a request to the CRS 803 for applet information used for authentication of the external electronic device 500. In operation 835, the CRS 803 may retrieve the applet information from the SSD 482 of the security module 330, and may transmit the applet information based on the retrieved result to the AMUI 801.

In operation 837, the AMUI 801 may display the applet information received from the CRS 803 on a display device (e.g., the display device 160 in FIG. 1), and may select an applet the priority of which is to be changed based on a user input onto the displayed applet information. The AMUI 801 may receive a user input making a request for configuring priority of the selected applet. Configuring priority of the applet may indicate an operation of assigning priority to the applet that has no priority or an operation of changing the priority that has been assigned to the applet.

In operation 839, the AMUI 801 may transmit a signal making a request for configuring priority of the selected applet to the CRS 803.

In operation 841, the CRS 803 may control the applet 805 so as to perform an operation of configuring priority of the selected applet. According to various embodiments of the disclosure, the applet 805 may change or produce priority information indicating the priority included in the selected applet based on the control of the CRS 803, thereby configuring the priority of the selected applet. The priority may represent the order in which authentication is performed on the external electronic device 500.

In operation 843, the applet 805 may transmit, to the PVKSE 807, a message indicating that the priority has been configured. In operation 845, the PVKSE 807 may produce or change information related to the applet in response to reception of the message indicating the priority configuration. If the priority of the applet 805 is changed, the PVKSE 807 may change the information related to the applet by changing the priority information included in the information on the activated applet 805 in the template shown in Table 2.

In operation 847, the applet 805 may transmit, to the CRS 803, a message notifying that the priority configuration is successful. In operation 849, the CRS 803 may transmit, to the AMUI 801, a message indicating that the priority configuration is successful. In operation 851, the AMUI 801 may update the applet list. The applet list may be updated based on the changed priority, and the applet list may be sorted according to the priority configured in each of the applets (e.g., the applets are arranged in descending order of the priority).

Figure 9:
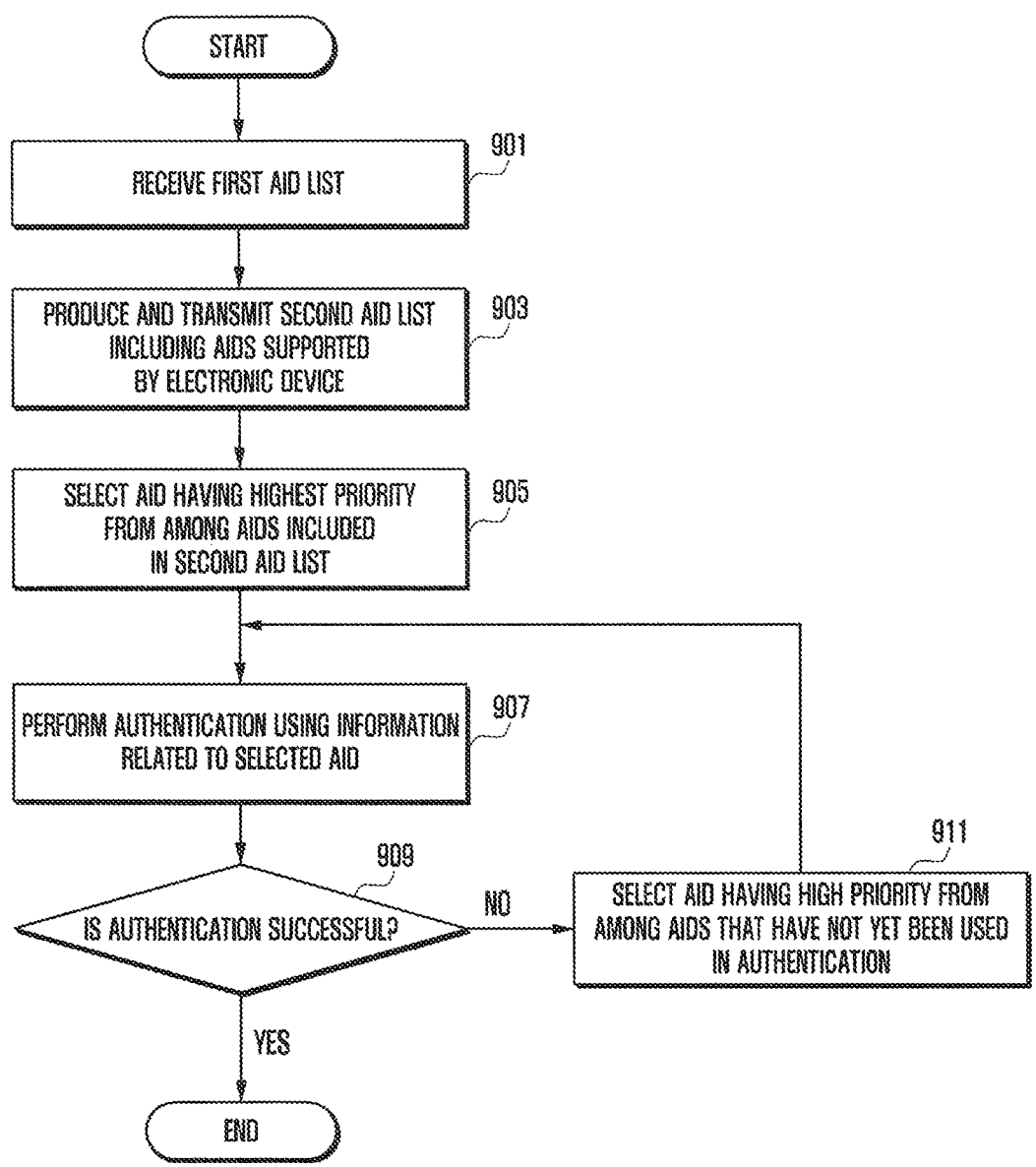
FIG. 9 is an operational flowchart illustrating an operation of performing authentication of an electronic device in an external electronic device shown in FIG. 3 in an operating method of an electronic device according to various embodiments of the disclosure.

FIG. 9 is an operational flowchart illustrating an operation of performing authentication of an electronic device in an electronic device shown in FIG. 5 in an operating method of an electronic device according to various embodiments of the disclosure.

In operation 901, a processor (e.g., the processor 510 in FIG. 5) of an electronic device (e.g., the electronic device 500 in FIG. 5) may receive a first AID list.

For example, the first AID list including identifications of activated applets among the applets stored in the security module 330 shown in FIG. 4 may include Vendor1 Vehicle Key2 (Vendor 1 VK2)/Vendor2 Vehicle Key1 (Vendor 2 VK1)/Sharing Key1 (SK1)/Sharing Key2 (SK2).

According to various embodiments of the disclosure, the processor 510 of the electronic device 500 may receive, from an external electronic device (e.g., the electronic device 300 in FIG. 3), a signal making a request for activating at least some of the various functions that can be executed by the electronic device 500. For example, the external electronic device 300 may produce a signal making a request for performing some functions of the electronic device 500 (e.g., a function of releasing the door lock of the electronic device 500, a function of turning on the lights of the electronic device 500, or a function of automatically pulling out the electronic device 500), based on a user input to the external electronic device 300, and may transmit the produced signal to the electronic device 500. In response to reception of the signal making a request for performing some functions of the electronic device 500, which is transmitted from the external electronic device 300, the processor 510 may initiate authentication with the external electronic device 300.

According to various embodiments of the disclosure, the first AID list may be produced by a PVKSE (e.g., the PVKSE 410 in FIG. 4) implemented in the security module 330 of the external electronic device 300.

In operation 903, the processor 510 may select one or more AIDs supported by the electronic device 500 from among the AIDs included in the first AID list, may produce a second AID list including the one or more selected AIDs, and may transmit the second AID list to the external electronic device 300.

According to various embodiments of the disclosure, the processor 510 may select the AIDs in a manner of selecting one or more AIDS remaining after filtering out applets having AIDs that are not supported by the electronic device 500 from among the AIDs included in the first AID list.

According to another embodiment of the disclosure, the processor 510 may select the AIDs in a manner of selecting the applets having the same AID as the manufacturer of the electronic device 500 from among the AIDs included in the first AID list.

According to still another embodiment of the disclosure, the processor 510 may select the AIDs in a manner of selecting the applets having the same AID as the manufacturer of the electronic device 500 from among the AIDs included in the first AID list and selecting one or more AIDs remaining after filtering out the applets having AIDs that are not supported by the electronic device 500 from among the AIDs corresponding to a sharing key.

For example, in the case where the electronic device 500 is manufactured by manufacturer 1, Vendor1 Vehicle Key2 (Vendor 1 VK2)/Sharing Key1 (SK1) that are the remaining AIDs, excluding Vendor2 Vehicle Key1 (Vendor 2 VK1) corresponding to manufacturer 2 and Sharing Key2 (SK2) corresponding to manufacturer 3, may be selected from among Vendor1 Vehicle Key2 (Vendor 1 VK2)/Vendor2 Vehicle Key1 (Vendor 2 VK1)/Sharing Key1 (SK1)/Sharing Key2 (SK2), which are the AIDs included in the first AID list.

According to various embodiments of the disclosure, the PVKSE 410 of the external electronic device 300 may receive the second AID list, and may transmit, to the electronic device 500, information related to the applets corresponding to the respective AIDs included in the second AID list. The electronic device 500 may receive the information related to the applets transmitted from the PVKSE 410.

For example, the second AID list may include the AIDs selected by the electronic device 500, and the second AID list may include Vendor1 Vehicle Key2 (Vendor 1 VK2)/Sharing Key1 (SK1).

In operation 905, the processor 510 may select an AID having the highest priority from among the AIDs included in the second AID list. In operation 907, the processor 510 may perform authentication using information related to the applet corresponding to the AID having the highest priority.

In operation 909, the processor 510 may determine whether or not authentication is successful, and if the authentication fails, in operation 911, the processor 510 may select an AID having the highest priority among the AIDs that are included in the second AID list and have not yet been used in authentication, and may repeat authentication described in operation 907.

An operating method of an electronic device according to various embodiments of the disclosure may include letting a communication module (the communication module 520 in FIG. 5) broadcast a connection request signal for a connection with an external electronic device (e.g., the electronic device 300 in FIG. 3) and establish a communication channel with the external electronic device 300 that responds to the broadcast signal, letting a security module (e.g., the security module 530 in FIG. 5) transmit a signal making a request for transmitting an AID list including one or more AIDs (application identifiers) stored in the external electronic device 300, letting the security module 530 select at least one AID from among the AIDs included in the AID list transmitted from the external electronic device 300, letting the security module 530 make a request to the external electronic device 300 for information indicating an applet corresponding to the selected AID and information related to the applet corresponding to the selected AID, and letting the security module 530 perform authentication with the external electronic device 300 using the information related to the applet received from the external electronic device 300.

According to various embodiments of the disclosure, the selecting at least one AID may include letting the security module 530 select the remaining AIDS, excluding AIDs corresponding to manufacturers other than the manufacturer of the electronic device (e.g., the electronic device 500 in FIG. 5), from among the AIDs included in the AID list, and the performing authentication with the external electronic device 400 may include performing authentication, based on the priority assigned to the AID.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including One or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a communication module configured to communicate with an external electronic device; and
   a security module configured to monitor a change in data related to applets for managing keys used for authentication of the external electronic device, manage information related to the applets, and store an applet identification (AID) list comprising one or more AIDs and the applets,
   wherein the security module is configured to:
      receive, from the external electronic device, a signal making a request for transmitting the AID list;
      in response to reception of the request signal, transmit the AID list to the external electronic device through the communication module;
      receive, from the external electronic device, a signal requesting information related to an applet associated with at least one AID selected from among the AIDs included in the AID list by the external electronic device; and
      transmit the information related to the applet corresponding to the selected at least one AID to the external electronic device without transmitting information related to all of the applets to the external electronic device such that the external electronic device performs authentication with regard to the applet corresponding to the selected at least one AID without performing authentication with regard to all of the applets, and wherein the information related to the applet comprises application-specific data including an available usage time of the external electronic device, geofencing limitation data of the external electronic device, and information indicating whether or not at least one of various functions that can be executed by the external electronic device is allowed, the geofencing limitation data including a geographic range in which driving of the external electronic device is allowed.

2. The electronic device of claim 1, wherein the information related to the applet comprises at least one of an address in which the applet is stored, the selected at least one AID, a model identifier of the external electronic device, data indicating whether or not to activate the applet, or priority assigned to each of the applets.

3. The electronic device of claim 1, wherein the AID list is sorted based on the priority assigned to each of the applets.

4. The electronic device of claim 1, wherein the security module further comprises:
a contactless register service (CRS) configured to manage data stored in the security module; and
a proximity vehicle key system environment (PVKSE) configured to monitor a change in data related to the applet and manage information related to the applet,
wherein the CRS, in response to a signal making a request for changing configuration of the applet, changes a configuration of the applet and transmits a signal indicating the change in the data to the PVKSE, and
wherein the PVKSE, in response to reception of the signal indicating the change in the data, changes the data related to the applet.

5. The electronic device of claim 4, wherein the PVKSE and the CRS are configured to be stored in an issued security domain of the security module, and
wherein the applet is configured to be stored in a supplementary security domain thereof.

6. The electronic device of claim 1, wherein the information related to the applet is configured to be stored in a supplementary secure domain separated for each applet.

7. The electronic device of claim 4, wherein the PVKSE is configured to change the information related to the applet if a change in the applet is detected.

8. An electronic device comprising:
a memory;
a security module configured to store data used for authentication with an external electronic device;
a communication module; and
a processor,
wherein the security module is configured to:
broadcast a connection request signal for a connection with the external electronic device;
establish a communication channel with the external electronic device that responds to the broadcast signal;
transmit a signal making a request for transmitting an application identifier (AID) list comprising one or more AIDs stored in the external electronic device;
select at least one AID from among the AIDs included in the AID list transmitted by the external electronic device based on whether the electronic device supports each of applets respective to the AIDs;
transmit, to the external electronic device, information indicating an applet corresponding to the selected at least one AID and a signal requesting information related to the selected applet, the information related to the applet comprising application-specific data including an available usage time of the electronic device, geofencing limitation data of the external electronic device, and information indicating whether or not at least one of various functions that can be executed by the electronic device is allowed and the geofencing limitation data including a geographic range in which driving of the electronic device is allowed; and
after receiving the information related to the selected applet, perform authentication with the external electronic device using the geofencing limitation data included in the information related to the applet without receiving information related to all of the applets from the external electronic device such that the electronic device performs authentication with regard to the applet corresponding to the selected AID without performing authentication with regard to all of the applets and is allowed to drive within the geographic range.

9. The electronic device of claim 8, wherein the security module is configured to perform authentication, based on a priority assigned to the applet.

10. The electronic device of claim 9, wherein the security module is configured to:
perform authentication for the external electronic device using the information related to the applet;
in response to identifying that the authentication has failed, select an AID having a lower priority than the selected at least one AID on which the authentication has been performed; and
request information related to an applet corresponding to the selected at least one AID.

11. The electronic device of claim 8, wherein the security module is configured to select an AID corresponding to a manufacturer of the electronic device from among the AIDs included in the AID list.

12. The electronic device of claim 8, wherein the security module is configured to select an AID having the highest priority from AIDs corresponding to a manufacturer of the electronic device, among the AIDs included in the AID list.

13. The electronic device of claim 8, wherein the AID list comprises at least one AID corresponding to the external electronic device and at least one AID corresponding to an external electronic device shared by other users.

14. The electronic device of claim 8, wherein the information related to the applet comprises at least one of an address in which the applet is stored, the selected at least one AID, a model identifier of the electronic device, data indicating whether or not to activate the applet, priority assigned to each applet, or application-specific data.

* * * * *

UNITED STATES PATENT AND TRADEMARK OFFICE
CERTIFICATE OF CORRECTION

| | |
|---|---|
| PATENT NO. | : 11,597,351 B2 |
| APPLICATION NO. | : 16/977731 |
| DATED | : March 7, 2023 |
| INVENTOR(S) | : Yang et al. |

It is certified that error appears in the above-identified patent and that said Letters Patent is hereby corrected as shown below:

On the Title Page

Item (86) PCT No.:
"PCT/EP2019/051663"
Should be:
-- PCT/KR2019/002945 --

Signed and Sealed this
Eleventh Day of April, 2023

Katherine Kelly Vidal
*Director of the United States Patent and Trademark Office*